US007684501B2

(12) United States Patent
Liu et al.

(10) Patent No.: US 7,684,501 B2
(45) Date of Patent: Mar. 23, 2010

(54) APPARATUS AND METHOD FOR CARRIER FREQUENCY OFFSET AND PHASE COMPENSATION IN COMMUNICATION SYSTEM

(75) Inventors: Der-Zheng Liu, TaiNan (TW); Song-Nien Tung, KaoHsiung (TW); Tai-Cheng Liu, KaoHsiung (TW); Kuang-Yu Yen, TaiChung (TW)

(73) Assignee: Realtek Semiconductor Corp., Hsinchu (TW)

( * ) Notice: Subject to any disclaimer, the term of this patent is extended or adjusted under 35 U.S.C. 154(b) by 1536 days.

(21) Appl. No.: 10/779,648

(22) Filed: Feb. 18, 2004

(65) Prior Publication Data

US 2004/0161047 A1 Aug. 19, 2004

Related U.S. Application Data

(63) Continuation-in-part of application No. 10/640,034, filed on Aug. 14, 2003, now Pat. No. 7,277,503.

(30) Foreign Application Priority Data

Feb. 19, 2003 (TW) .............................. 92103827 A

(51) Int. Cl.
*H04K 1/10* (2006.01)
(52) U.S. Cl. ...................... 375/260; 375/326; 375/347; 375/344; 375/355; 370/203; 370/206; 370/330; 370/347; 331/10
(58) Field of Classification Search ................. 375/260, 375/326, 347, 344, 355, 327, 371; 370/203, 370/206, 330, 347; 331/10
See application file for complete search history.

(56) References Cited

U.S. PATENT DOCUMENTS 4,987,386 A * 1/1991 Poklemba et al. ............. 331/10

5,285,474 A 2/1994 Chow et al.
5,790,604 A * 8/1998 Kelton et al. ................ 375/344

(Continued)

FOREIGN PATENT DOCUMENTS

JP 409093302 A * 4/1997
JP 11-308821 11/1999
JP 2001-053712 2/2001

OTHER PUBLICATIONS

Zheng Du, and Jinkang Zhu, "A pilot-based frequency offset tracking scheme in OFDM systems", 2001 International Conferences on Info-Tech and Info-Net, vol. 2, pp. 566-571, Beijing, China, Oct. 29, 2001-Nov. 1, 2001.

(Continued)

*Primary Examiner*—Sudhanshu C Pathak
(74) *Attorney, Agent, or Firm*—Thomas, Kayden, Horstemeyer & Risley

(57) ABSTRACT

The present invention provides apparatus and methods for carrier frequency offset and phase compensation, which can compensate the phase rotation of an OFDM symbol resulted from carrier frequency offset between the receiver and transmitter of an OFDM System. The apparatus and method for carrier frequency offset compensation generates an estimated carrier frequency offset according to a phase error between estimated frequency responses of two consecutive received OFDM symbols within the pilot subchannel, and calculates an accumulated phase rotation, according to the estimated carrier frequency offset, for compensating the received OFDM symbol. On the other hand, the apparatus and method for phase compensation generates an estimated residual phase error according to the pilot signal of a frequency offset-compensated OFDM symbol and the original pilot signal transmitted by the transmitter, and compensates the frequency offset-compensated OFDM symbol or a following one according to the estimated residual phase error.

11 Claims, 10 Drawing Sheets

U.S. PATENT DOCUMENTS

| | | | | |
|---|---|---|---|---|
| 6,928,120 | B1 | 8/2005 | Zhang | 375/260 |
| 7,009,932 | B2 | 3/2006 | Matheus | 370/208 |
| 7,058,002 | B1 | 6/2006 | Kumagai | 370/203 |
| 7,123,670 | B2 | 10/2006 | Gilbert | 375/344 |
| 7,139,320 | B1 | 11/2006 | Singh | 375/260 |
| 7,149,266 | B1* | 12/2006 | Imamura et al. | 375/355 |
| 7,310,302 | B2* | 12/2007 | Cimini et al. | 370/203 |
| 7,324,599 | B2* | 1/2008 | Frank et al. | 375/260 |
| 2002/0101840 | A1* | 8/2002 | Davidsson et al. | 370/330 |
| 2003/0108127 | A1 | 6/2003 | Eilts | 375/340 |
| 2003/0128660 | A1 | 7/2003 | Ito | |
| 2003/0231718 | A1* | 12/2003 | Jiang | 375/326 |
| 2004/0100939 | A1* | 5/2004 | Kriedte et al. | 370/347 |
| 2004/0170227 | A1* | 9/2004 | Frank et al. | 375/260 |
| 2005/0169165 | A1* | 8/2005 | Cimini et al. | 370/206 |
| 2007/0248199 | A1* | 10/2007 | Steele et al. | 375/347 |

OTHER PUBLICATIONS

Yan Zhang and Xiaohu Yu, "An improved automatic frequency correction scheme for discontinous pilot mobile communication system," IEEE 2001 Spring Vehicular Technology Conference, vol. 3, pp. 1708-1712, Rhodes, Greece, 6-9, May 2001.

Yang-Seok, Choi, P.J. Voltz, and F.A. Cassara, "ML estimation of carrier frequency offset for multicarrier signals in Rayleigh fading channels," IEEE Transactions on Vehicular Technology, vol. 50, pp. 644-655, Mar. 2001.

Bor-Sen Chen, and Chang-Lan Tsai, "Frequency offset estimation in an OFDM system," 2001 IEEE Third Workshop on Signal Processing Advances in Wireless Communications (SPAWC '01) pp. 150-153, Taiwan, Mar. 20-23, 2001.

M.J. Fernandez-Getino Garcia, O. Edfors, and J.M. Paez-Borrallo, "Frequency offset correction for coherent OFDM in wireless systems", IEEE Transactions on Consumer Electronics, vol. 47, pp. 187-193, Feb. 2001.

M.R. Dacca, G. Levin, and D. Wulich, "Frequency offset tracking in OFDM based on multicarrier PLL.", 21st Century Military Communications Conference, vol. 2, pp. 912-916, Oct. 22-25, 2000.

John A. C. Bingham, "Multi-Carrier Modulation for Data Transmission: An Ideal Whose Time Has Come" IEEE Communication Magazine, May 1990, p. 5-14.

Thierry Pollet and Miguel Peeters, Alcatel "Synchronization with DMT Modulation" IEEE Communications Magazine, Apr. 1999.

Thierry Pollet, Paul Spruyt and March Moeneclaey, "The BER Performance of OFDM Systems Using Non-Synchronize Sampling", Proc. Globecom '94, San Francisco, CA, Dec. 27-29, 1994, pp. 253-257.

Leland B. Jackson, "Signals, Systems, and Transforms", Addison-Wesley Publishing Company, Inc., 1991, p. 410.

Jack S. Chow, Jerry C. Tu, and J.M. Cioffi, "A Discrete Multitone Transceiver System for HDSL Applications", IEEE J. on Sel Areas in Comm., vol. 9, No. 6, pp. 895-908, Aug. 1991.

J.S. Chow, J.M. Cioffi, and J.A.C. Bingham, "Equalizer training algorithms for multicarrier modulation system", ICC, pp. 761-765, May 1993.

J.W. Melsa, Richard C. Younce and Charles E. Rohrs, "Impulse Response Shortening for Discrete Multitone Transceivers", IEEE Trans. on Comm., vol. 44, No. 12, pp. 1662-1672, Dec. 1996.

N. Al-Dhahir and J.M. Cioffi, "Efficiently computed reduced-parameter input-aided MMSE equalizers for ML detection: A unified approach", IEEE Trans. on Info. Theory, vol. 42, pp. 903-915, May 1996.

N. Al-Dhahir and J.M. Cioffi, "Optimum finite-length equalization for multicarrier transceivers", IEEE Trans. on Comm., vol. 44, pp. 56-63, Jan. 1996.

Werner Henkel, and Thomas Kessler, "Maximizing the Channel Capacity of Multicarrier Transmission by Suitable Adaptataion of the Time-Domain Equalizer", IEEE Trans. on Comm., vol. 48, No. 12, Dec. 2000.

Katleen et al., "Per Tone Equalization for DMT-Based Systems", IEEE Trans. on Comm., vol. 49, No. 1, Jan. 2001.

Guner Arslan et al., "Equalization for Discrete Multitone Transceivers to Maximize Bit Rate", IEEE Trans. on Signal processing, Jul. 2001.

\* cited by examiner

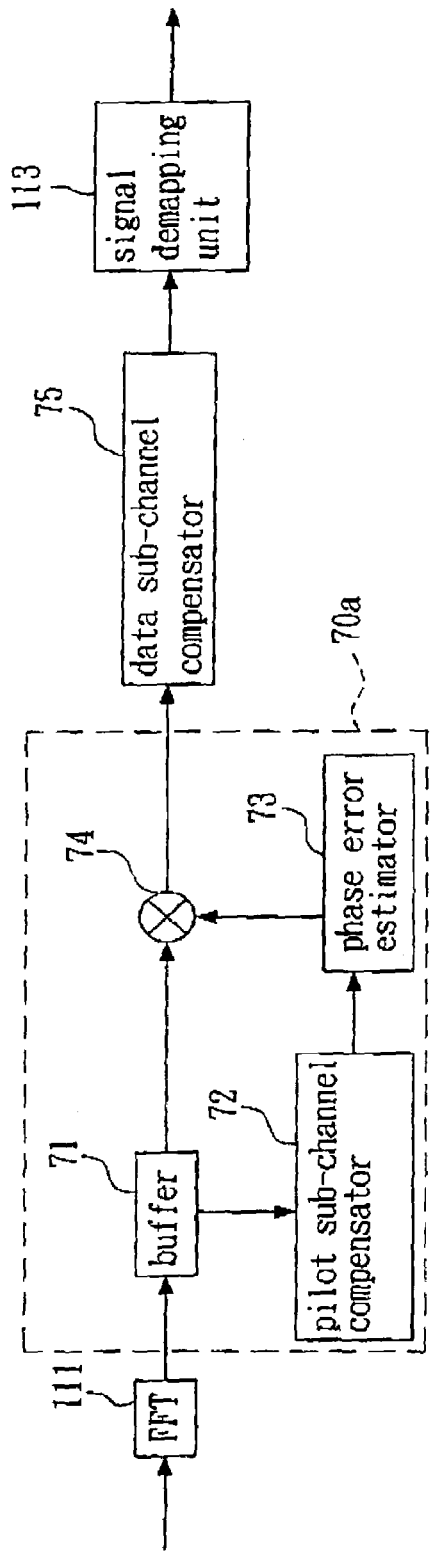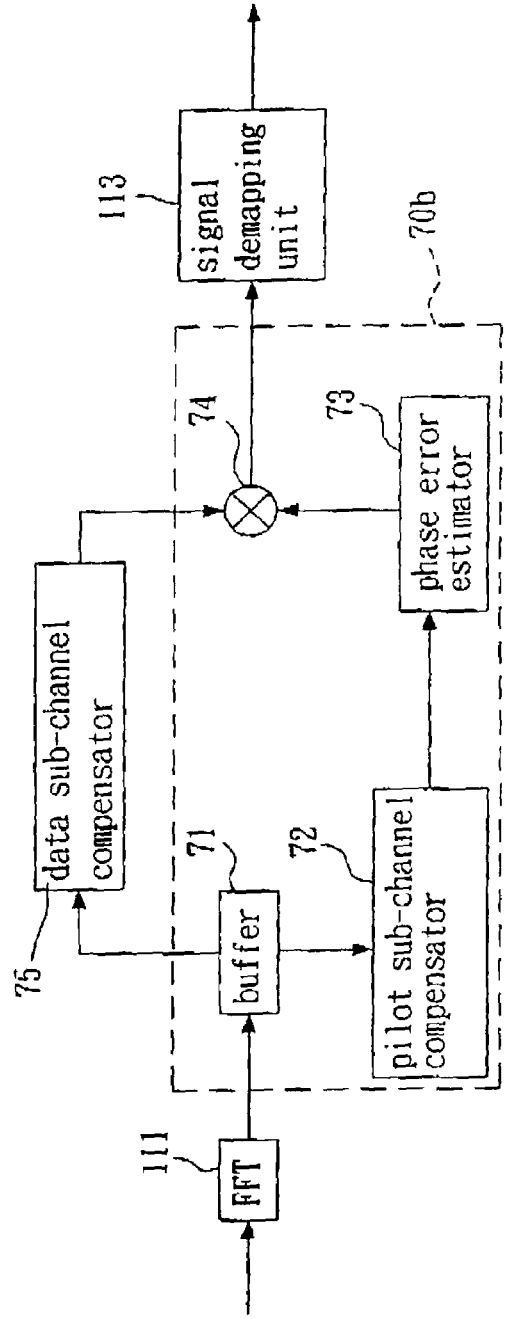
FIG. 7A
FIG. 7B

APPARATUS AND METHOD FOR CARRIER FREQUENCY OFFSET AND PHASE COMPENSATION IN COMMUNICATION SYSTEM

CROSS-REFERENCE TO RELATED APPLICATIONS

This application is a continuation-in-part (CIP) application of U.S. patent application with Ser. No. 10/640,034 and filing date Aug. 14, 2003 now U.S. Pat. No. 7,277,503 which is now pending.

BACKGROUND OF THE INVENTION (a). Field of the Invention

The present invention relates in general to a communication system, and more particularly to an apparatus for estimating and compensating the carrier frequency offset and phase error in a communication system and a method thereof.

(b). Description of the Prior Arts

In recent years, the orthogonal frequency division multiplexing (OFDM) technology is widely applied to high-speed communication systems, such as asymmetric digital subscriber loop (ADSL), IEEE 802.11a/g wireless local area network (WLAN), etc. FIG. 1 is a block diagram of a typical OFDM communication system 100. The transmitter of the OFDM system 100 first distributes the data under transmission into N frequency-domain subchannels (N=$2^n$, n is an integer) via a signal mapping unit 101, and maintains the orthogonality among the signals of each subchannel to prevent inter-carrier interference (ICI). Next, an inverse fast Fourier transform (IFFT) device 102 is used to transform the subchannel signals into time-domain signals, to which a guard interval (GI) is added by a GI adding device 103. Then, each of these time-domain signals is passed through a parallel-to-serial converter (P/S) 104 and a digital-to-analog converter (DAC) 105, modulated by a carrier and then transmitted via a channel 106. The receiver of the OFDM system 100 first performs carrier demodulation on the received time-domain signals and then an analog-to-digital converter (ADC) 107 is used to sample the demodulated signals. Next, the guard interval of the sampled signals is removed by a GI removal unit 109. The result thereof is provided to a serial-to parallel converter (S/P) 110, and then a fast Fourier transform (FFT) device 110 is used for transforming to frequency-domain signals. Last, the receiver compensates these frequency-domain signals by a channel compensator 112 and performs signal demodulation via a signal demapping unit 113 to recover to the original transmitted data.

A set of N-point IFFT output is typically called a symbol. Since the channel impulse response (CIR) is usually not ideal, a received symbol after passing through the channel 106 would impact the reception of subsequent symbols, i.e. inter-symbol interference (ISI). To prevent ISI, an additional guard interval (GI) is added between two OFDM symbols. Two typical ways to implement the guard interval are zero-padding (ZP) and cyclic prefix (CP). In ZP, a string of zero is added as the guard interval and energy efficiency is thus improved. In CP, a latter portion of a symbol is copied and put before the symbol as the guard interval. CP can reduce the ICI resulted from the channel impulse response. Circuits 103 and 109 of FIG. 1 are used to add and remove the guard interval respectively.

When demodulating OFDM symbols, the receiver of the OFDM system 100 needs to transform the received time-domain signals into frequency-domain signals by the FFT device 111 and performs the demodulation within each subchannel respectively. If synchronization error exists in the time-domain signals inputted to the FFT device 111, then additional ICI and phase rotation would be generated in the output frequency-domain signals to damage the orthogonality of the outputted frequency-domain signals. The system performance would thus be degraded. For the OFDM system, the synchronization error resulted from: (1) carrier frequency offset, (2) carrier phase error, (3) sampling frequency offset, and (4) sampling phase error.

In view of this, the present invention provides an apparatus and a method that can track and compensate the carrier frequency offset by using the pilot signal of an OFDM symbol, thereby upgrading the performance of an OFDM system.

SUMMARY OF THE INVENTION

The present invention is generally applied to a communication system which encodes data as symbol signals at the transmitter and uses a carrier to modulate the symbol signals for transmission in a plurality of subchannels. The symbol signal includes a pilot signal and a data signal. The subchannels include at least a pilot subchannel for transmitting the pilot signal and at least a data subchannel for transmitting the data signal. The pilot signal is predetermined, and the present invention employs it to estimate and compensate carrier frequency offset and related phase error, thereby preventing the carrier frequency offset from impacting the signal demodulation at the receiver of the communication system. Therefore, the present invention provides an apparatus for carrier frequency offset compensation at the receiver of the communication system. The apparatus includes: a pilot subchannel estimator for generating an estimated frequency response of the pilot signal; a frequency offset estimator, coupled to the pilot subchannel estimator, for generating an estimated carrier frequency offset according to a phase error of the estimated frequency response of the symbol signal and a following symbol signal; a phase accumulator, coupled to the frequency offset estimator, for calculating an accumulated phase rotation according to the estimated carrier frequency offset; and a phase rotator, coupled to the phase accumulator, for carrier frequency offset compensation according to the accumulated phase rotation.

In another aspect, the present invention provides an apparatus for phase compensation at the receiver. The apparatus includes: a carrier frequency offset compensator to perform a carrier frequency offset compensation on the symbol signal; a channel compensator to perform a channel compensation on the symbol signal; a phase error estimator for extracting the pilot signal and generating an estimated residual phase error between the extracted pilot signal and an original pilot signal; a buffer for storing the estimated residual phase error; and a phase rotator, coupled to the buffer, for compensating a following symbol signal according to the estimated residual phase error.

In another aspect, the present invention provides a compensating module at the receiver. The compensating module includes: a frequency offset compensator to perform a frequency offset compensation on the symbol signal according to an estimated frequency response of the pilot subchannel transmitting the pilot signal; and a phase compensator to perform a phase compensation on the frequency offset compensated symbol signal according to an estimated residual phase error of the pilot signal.

In another aspect, the present invention provides a method for carrier frequency offset compensation used at the receiver. The method includes: generating an estimated frequency response of the pilot signal; determining a phase error according to the estimated frequency response of the pilot signal of the symbol signal and the estimated frequency response of the pilot signal of a following symbol signal; generating an estimated carrier frequency offset according to the phase error, calculating an accumulated phase rotation according to the estimated carrier frequency offset; and performing carrier frequency offset compensation according to the accumulated phase rotation.

In another aspect, the present invention provides a method for phase compensation used at the receiver. The method includes: extracting the pilot signal; generating an estimated residual phase error between the extracted pilot signal and an original pilot signal transmitted by the transmitter; and compensating a following symbol signal according to the estimated residual phase error.

In another aspect, the present invention provides a method for phase compensation used at the receiver. The method includes: storing the symbol signal; extracting and compensating the pilot signal to generate a channel-compensated pilot signal; generating an estimated residual phase error between the channel-compensated pilot signal and an original pilot signal transmitted by the transmitter; and extracting and compensating the data signal according to the estimated residual phase error.

BRIEF DESCRIPTION OF THE DRAWINGS

FIG. 7a is a block diagram of an apparatus for buffered phase compensation according to the present invention.

FIG. 7b is a block diagram of an alternative apparatus for buffered phase compensation according to the present invention.

DETAILED DESCRIPTION OF THE PRESENT INVENTION

Figure 1:
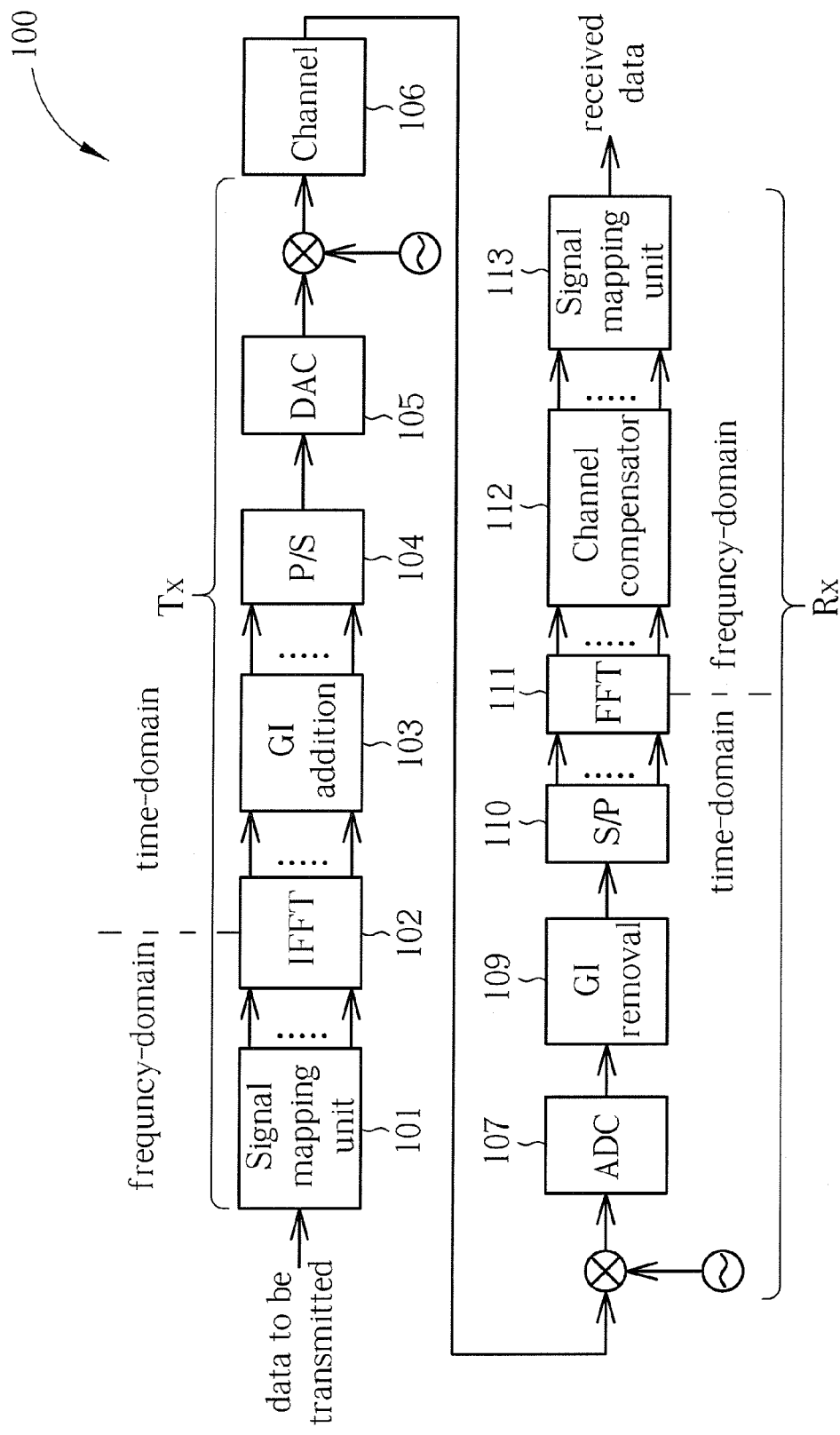
FIG. 1 is a block diagram of a typical OFDM communication system.
Figure 2:
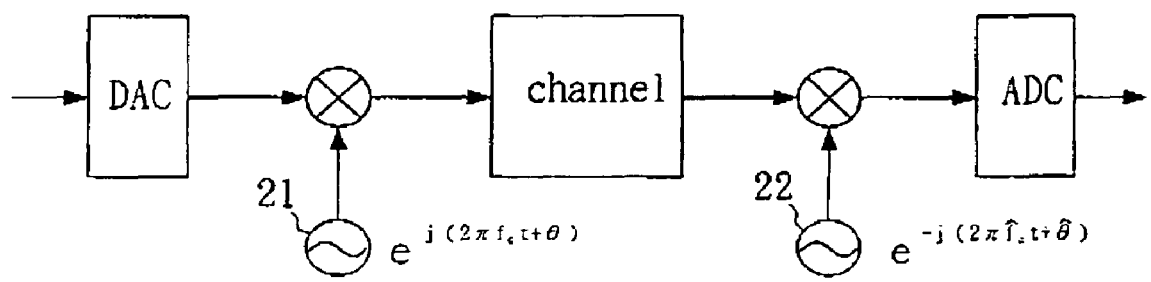
FIG. 2 is a diagram showing an OFDM system with a carrier frequency offset.

The preferred embodiments of the present invention used in an OFDM system are described in detail below. FIG. 2 is a diagram showing an OFDM system with a carrier frequency offset. In FIG. 2, since the frequencies of local oscillators 21 and 22 have a drift, the carrier frequency $f_c$ at the transmitter may not equal the carrier frequency $\hat{f}_c$ at the receiver. This would result in a phase rotation of baseband signals at the receiver and generate an error to impact system performance when performing signal demodulation. The carrier frequency offset is expressed as $\Delta f = f_c - \hat{f}_c$ for convenience here. Besides, it is assumed that the OFDM system employs N subchannels, which includes at least a pilot subchannel for transmitting the pilot signal of an OFDM symbol, and others are data subchannels for transmitting the data signal of the OFDM symbol.

The influence of the carrier frequency offset on an OFDM symbol may be explained in terms of time domain and frequency domain. In the aspect of time domain, if time-domain signals of the OFDM symbol have $N+N_{G1}$ sampling points, where N is the number of points of FFT and $N_{G1}$ is the number of points of a guard interval, then there is a phase error of $2\pi(N+N_{G1})\Delta fT$ between the corresponding sampling points of two consecutive OFDM symbols, where T is the sampling interval. This phase error would accumulate as the number of transmitted symbols increases.

In the aspect of frequency domain, if assuming that the frequency response of the k-th subchannel is fixed as $H_k$ and the k-th subchannel signal of the n-th OFDM symbol at the transmitter is $X_{n,k}$, then the k-th subchannel signal of the n-th OFDM symbol at the receiver is $$Y_{n,k} = e^{j[2\pi n(N+N_{G1})\Delta fT+\Delta\theta]} \cdot [(H_k \cdot X_{n,k}) \otimes \Phi(f_k - \Delta f)] \qquad (1\text{-}1)$$

$$= e^{j[2\pi n(N+N_{G1})\Delta fT+\Delta\theta]} \cdot H_k \cdot X_{n,k} \cdot \Phi(-\Delta f) +$$

$$\underbrace{e^{j[2\pi n(N+N_{G1})\Delta fT+\Delta\theta]} \cdot \sum_{i=0,(i\neq k)}^{N-1} H_i \cdot X_{n,i} \cdot \Phi(f_k - f_i - \Delta f)}_{ICI}$$

where $\Delta\theta = \theta - \hat{\theta}$ is the initial phase error, and $\Phi(f)$ is the discrete-time Fourier transform (DTFT) of a rectangular window function with N points of 1, that is, $$\Phi(f) = \sum_{n=0}^{N-1} 1 \cdot e^{-j2\pi nfT} = \frac{1 - e^{-j2\pi NfT}}{1 - e^{-j2\pi fT}} = e^{-j\pi(N-1)fT} \cdot \frac{\sin(\pi NfT)}{\sin(\pi fT)}$$

In equation (1-1), $\Phi(-\Delta f)$ is the distortion factor of each subchannel, where the amplitude distortion is $$\frac{\sin(\pi N\Delta fT)}{\sin(\pi\Delta fT)}$$

and the phase distortion is $\pi(N-1)\Delta fT$.

Since the pilot subchannel transmits a predetermined pilot signal, the following equation can be used to obtain an estimated frequency response of the pilot subchannel:

$$\hat{H}_{n,k} = \frac{Y_{n,k}}{X_{n,k}} = e^{j[2\pi n(N+N_{G1})\Delta fT+\Delta\theta]} \cdot H_k \cdot \Phi(-\Delta f) + \Gamma_{n,k} \qquad (1\text{-}2)$$

where k is the pilot index, $X_{n,k}$ is the predetermined pilot signal, and $\Gamma_{n,k}$ represents ICI and other noises.

Based on above analysis, the carrier frequency offset can be estimated by the phase error between the estimated frequency responses of two consecutive OFDM symbols. If the OFDM system employs K pilot subchannels, then the carrier frequency offset can be estimated by averaging the phase error between the estimated frequency responses of two consecutive OFDM symbols within each pilot subchannel. That is, $$2\pi(N + N_{GI})\Delta \hat{f}_n T = \frac{1}{K} \sum_{k=pilot\ index} \left( \angle \hat{H}_{n,k} - \angle \hat{H}_{n-1,k} \right) \quad (1\text{-}3)$$

where $\Delta \hat{f}_n$ is the carrier frequency offset estimated according to the n-th symbol.

Figure 3A:
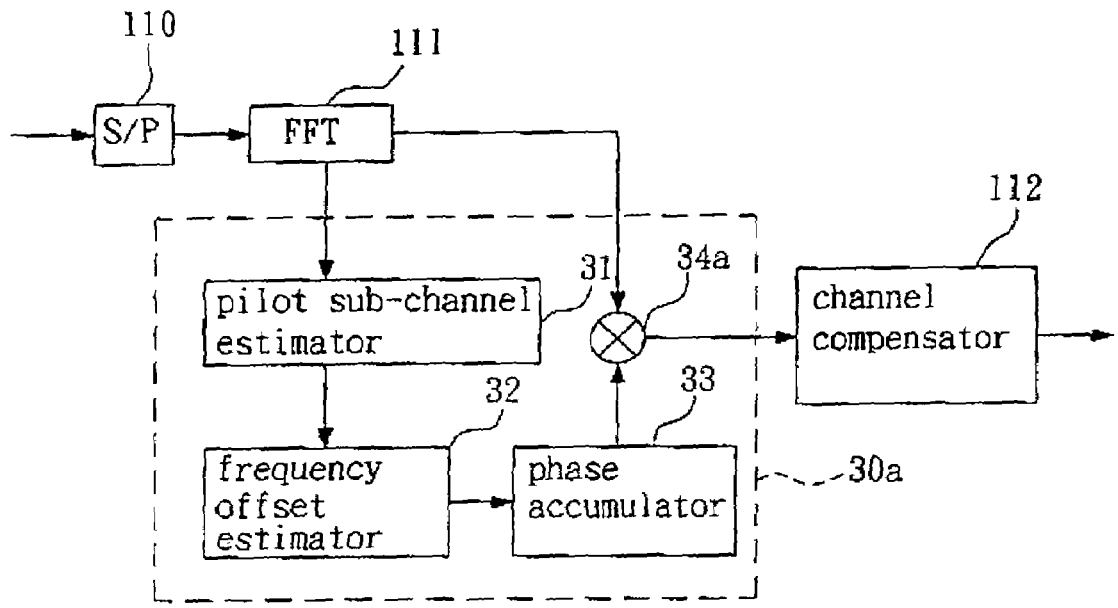
FIG. 3a is a block diagram of an apparatus for carrier frequency offset compensation in frequency domain according to the present invention.

When the carrier frequency offset is not large, the influence of the ICI term $\Gamma_{n,k}$ in equation (1-2) can be ignored, and the amplitude and phase distortion can be removed by channel compensation. Thus, in this case, we only need to compensate the accumulated phase rotation in frequency domain. Based on above analysis, the present invention provides an apparatus 30a for carrier frequency offset compensation in frequency domain, as shown in FIG. 3a. The apparatus 30a is deployed at the receiver of the OFDM system to compensate the accumulated phase rotation of the OFDM symbol resulted from the carrier frequency offset between the receiver and transmitter in frequency domain. The apparatus 30a includes: a pilot subchannel estimator 31 for generating an estimated frequency response of a received OFDM symbol within the pilot subchannel according to the pilot signal of the received OFDM symbol (as shown in equation (1-2)); a frequency offset estimator 32, coupled to the pilot subchannel estimator 31, for generating an estimated carrier frequency offset according to the phase error between the estimated frequency responses of two consecutive received OFDM symbols; a phase accumulator 33, coupled to the frequency offset estimator 32, for calculating an accumulated phase rotation according to the estimated carrier frequency offset; and a phase rotator 34a, coupled to the phase accumulator 33, for compensating the received OFDM symbol (i.e. $Y_{n,k}$ in equation (1-1)) according to the accumulated phase rotation.

Figure 3B:
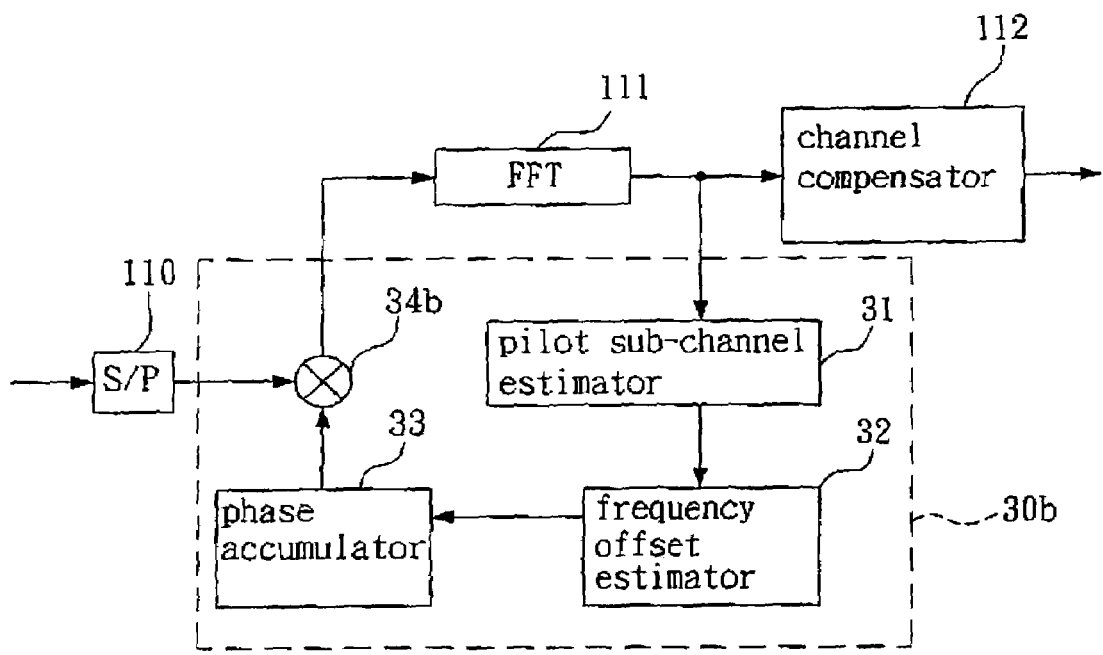
FIG. 3b is a block diagram of an apparatus for carrier frequency offset compensation in time domain according to the present invention.

When the carrier frequency offset is large, the ICI term $\Gamma_{n,k}$ in equation (1-2) cannot be ignored in frequency domain. Thus, it would be better to compensate the accumulated phase rotation in time domain. The present invention provides an apparatus 30b for carrier frequency offset compensation in time domain, as shown in FIG. 3b. The apparatus 30b is deployed at the receiver of the OFDM system to compensate the accumulated phase rotation of the OFDM symbol resulted from the carrier frequency offset between the receiver and transmitter in time domain. The components of the apparatus 30b are the same as those of the apparatus 30a, except the phase rotator. In the apparatus 30a, the phase rotator 30a is coupled to the output of the FFT 111, i.e. to compensate the accumulated phase rotation in frequency domain; in the apparatus 30b, the phase rotator 30b is coupled to the input of the FFT 111, i.e. to compensate the accumulated phase rotation in time domain.

Figure 4:
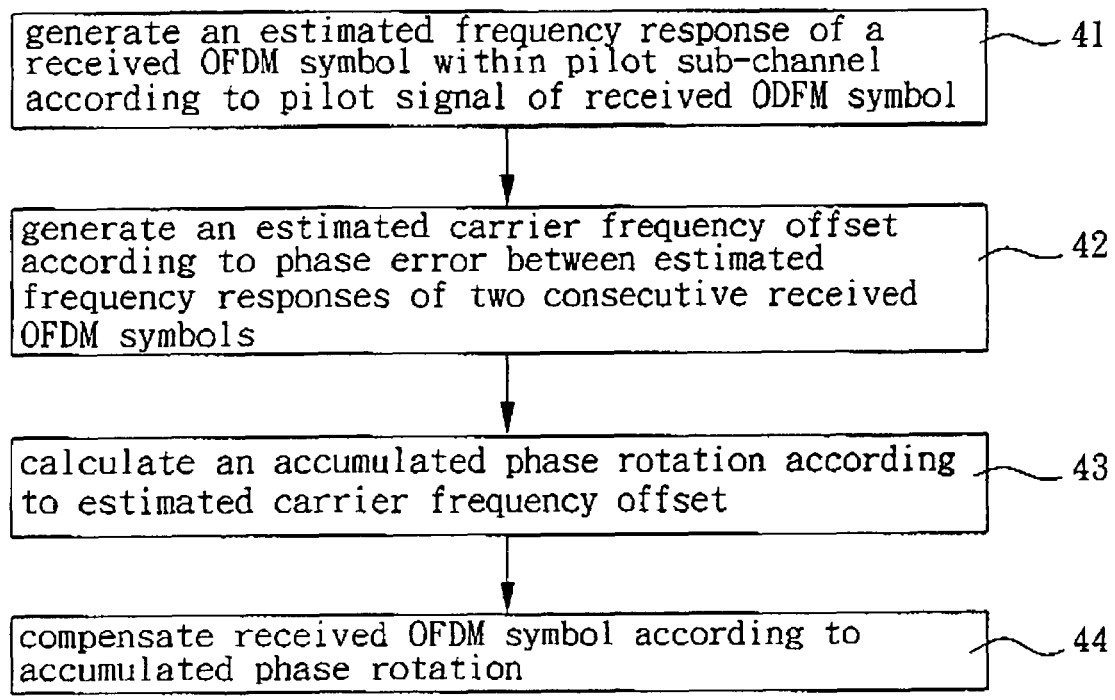
FIG. 4 is a flow chart of the method for carrier frequency offset compensation according to the present invention.

By applying the apparatus 30a or 30b, the present invention provides a method for carrier frequency offset compensation, which includes the steps as shown in FIG. 4:

41 the pilot subchannel estimator 31 generating an estimated frequency response of a received OFDM symbol of the pilot subchannel according to the pilot signal of the received OFDM symbol;

42 the frequency offset estimator 32 generating an estimated carrier frequency offset according to the phase error between the estimated frequency responses of two consecutive received OFDM symbols;

43 the phase accumulator 33 calculating an accumulated phase rotation according to the estimated carrier frequency offset; and 44 the phase rotator 34a or 34b compensating the received OFDM symbol according to the accumulated phase rotation.

If the OFDM system uses a plurality of pilot subchannel, then in the step 41, the estimated frequency response is generated for each pilot subchannel respectively, and in the step 42, the carrier frequency offset can be generated by averaging the phase error between the estimated frequency responses of two consecutive OFDM symbols of each pilot subchannel, as shown in equation (1-3).

If the apparatus 30a is used, then frequency-domain signals (i.e. signals of the subchannels) of the received OFDM symbol are compensated in the step 44; if the apparatus 30b is used, then time-domain signals of the received OFDM symbol are compensated in the step 44.

After the received OFDM symbol is compensated by the apparatus 30a or 30b, there still exists a residual phase error. If coherent demodulation is performed for each subchannel of the OFDM system (i.e. the amplitude and phase of a signal at the receiver should be identical to those of the original signal at the transmitter), then a solution for compensating the residual phase error is necessary.

After being compensated by the apparatus 30a/30b, the k-th subchannel signal of the n-th OFDM symbol at the receiver is $$\tilde{Y}_{n,k} = e^{j\Delta\theta_n} \cdot H_k \cdot X_{n,k} + \tilde{\Gamma}_{n,k} \quad (2\text{-}1)$$

where $\Delta\theta_n$ is the residual phase error, $\tilde{\Gamma}_{n,k}$ represents ICI and other noises, and k is the pilot index.

Thus, according to equation (2-1), the pilot signal at the receiver after channel compensation is $$\tilde{X}_{n,k} = \frac{\tilde{Y}_{n,k}}{\hat{H}_k} = e^{j\Delta\theta_n} \cdot X_{n,k} + \Theta_{n,k} \quad (2\text{-}2)$$

where $\hat{H}_k$ is the estimated frequency response of the k-th subchannel by using a preamble of the OFDM system, and $\Theta_{n,k}$ represents ICI and other noises.

Based on above analysis, the residual phase error can be estimated by the phase error between the channel-compensated pilot signal at the receiver and the original pilot signal at the transmitter. If the OFDM system employs K pilot subchannels, then the residual phase error can be estimated by averaging the phase error between the channel-compensated pilot signal at the receiver and the original pilot signal at the transmitter for each pilot subchannel. That is, $$\Delta \hat{\theta}_n = \frac{1}{K} \sum_{k=pilot\ index} \left( \angle \tilde{X}_{n,k} - \angle X_{n,k} \right) \quad (2\text{-}3)$$

Figure 5A:
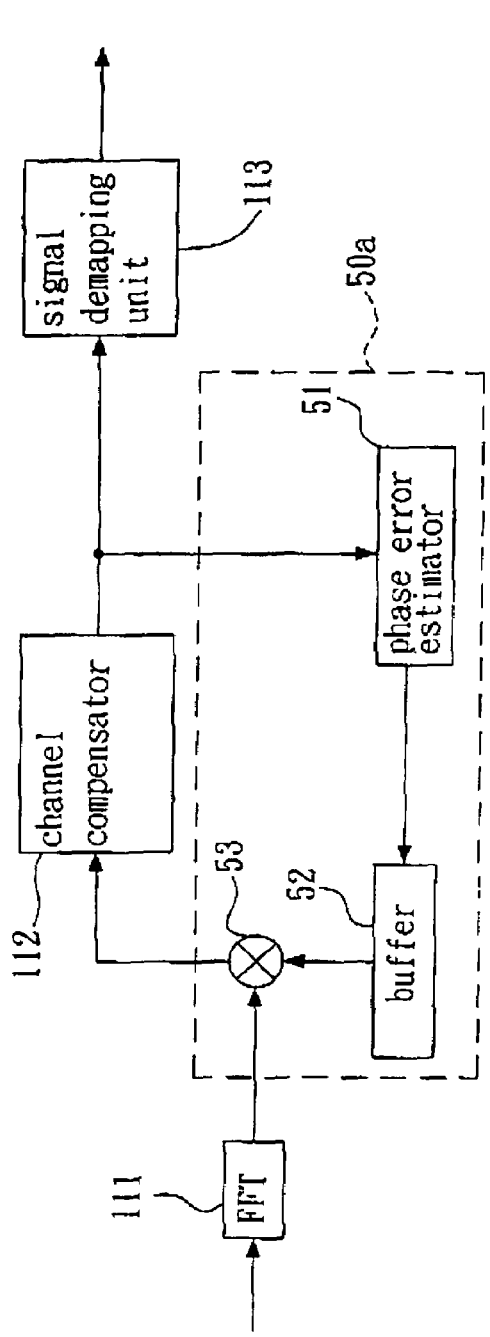
FIG. 5a is a block diagram of an apparatus for delayed phase compensation according to the present invention.

When the phase noise of the local oscillators 21 and 22 is not large and the residual phase error variation for two consecutive OFDM symbols is not large, the estimated residual phase error generated by the pilot signal of the former OFDM symbol can be employed to compensate the phase error of subchannel signals of the latter OFDM symbol. Therefore, the present invention provides an apparatus 50a for delayed phase compensation, as shown in FIG. 5a. Here the "delayed" means that the apparatus 50a is to compensate the latter OFDM symbol based on the estimation of the former OFDM symbol. The apparatus 50a is deployed at the receiver of the OFDM system to compensate a received OFDM symbol with the residual phase error, which is estimated after the received OFDM symbol being compensated by the apparatus 30a/30b. The apparatus 50a includes; a phase error estimator 51 for extracting the pilot signal (i.e. $\tilde{X}_{n,k}$ of equation (2-2)) of the received OFDM symbol which is compensated by the apparatus 30a/30b and the channel compensator 112, and for generating an estimated residual phase error between the extracted pilot signal and the original pilot signal transmitted by the transmitter; a buffer 52 for storing the estimated residual phase error; and a phase rotator 53, coupled to the buffer 52, for compensating a next received OFDM symbol with the estimated residual phase error.

Figure 5B:
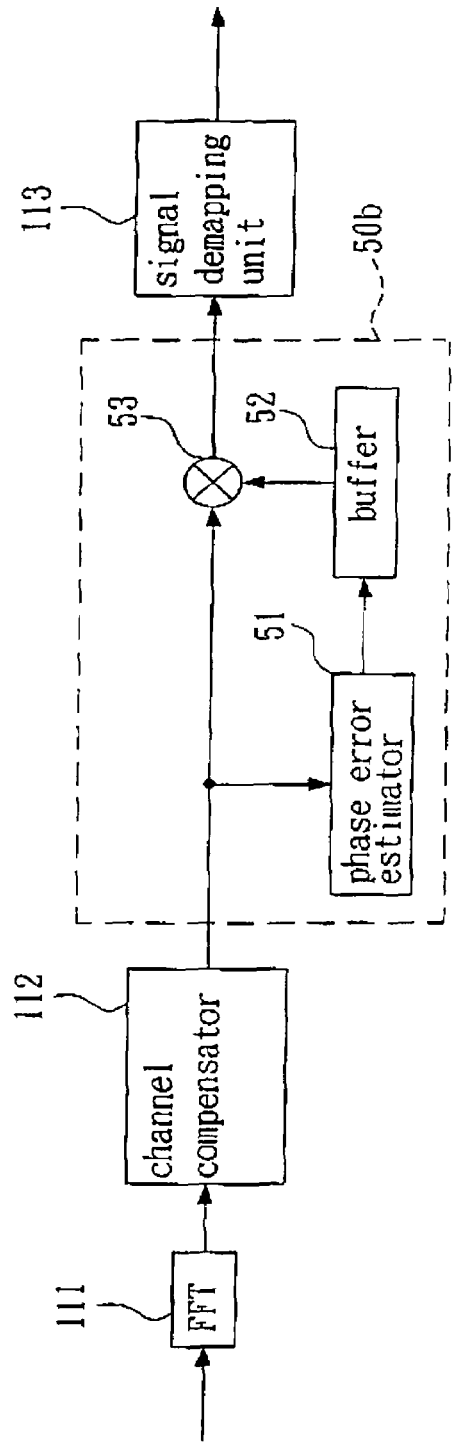
FIG. 5b is a block diagram of an alternative apparatus for delayed phase compensation according to the present invention.

The architecture of FIG. 5a can be modified as FIG. 5b, where the components of the apparatus 50b are the same as those of the apparatus 50a, while in operation, the architecture of FIG. 5b compensates the next received OFDM symbol by the channel compensator 112 before providing it to the phase rotator 53.

Figure 6:
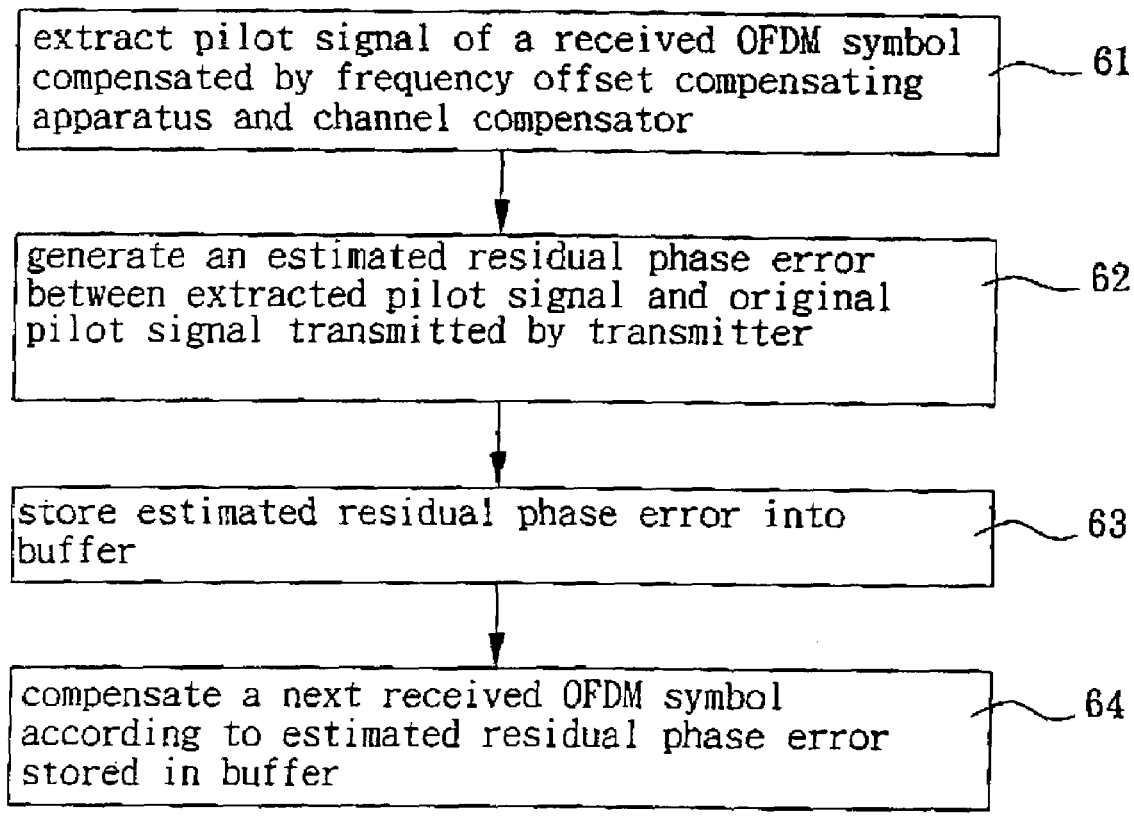
FIG. 6 is a flow chart of a method for delayed phase compensation according to the present invention.

By applying the apparatus 50a, the present invention provides a method for delayed phase compensation, which includes the steps as shown in FIG. 6:

61 the phase error estimator 51 extracting the pilot signal of a received OFDM symbol which is compensated by the apparatus 30a/30b and the channel compensator 112;

62 the phase error estimator 51 generating an estimated residual phase error between the extracted pilot signal and the original pilot signal transmitted by the transmitter;

63 storing the estimated residual phase error into the buffer 52; and 64 compensating a next received OFDM symbol according to the estimated residual phase error stored in the buffer 52.

If the OFDM system uses a plurality of pilot subchannel, then in the step 62, the estimated residual phase error can be generated by averaging the phase error between the extracted pilot signal and the original pilot signal transmitted by the transmitter within each pilot subchannel, as shown in equation (2-3).

If the apparatus 50b is applied, then the steps 61-64 are the same except in the step 64 the next received OFDM symbol is compensated by the channel compensator 112 before phase compensation.

When the phase noise of the local oscillators 21 and 22 is large, the residual phase error variation for two consecutive OFDM symbols is also large. In this case, it is better to employ the estimated residual phase error generated by the pilot signal of an OFDM symbol to compensate the data signal of the same OFDM symbol. Thus, a buffer is used to hold all subchannel signals (including pilot and data signals) of an OFDM symbol. The pilot signal is first extracted for estimating a residual phase error, and then the data signal is extracted and compensated with the estimated residual phase error. Consequently, the present invention provides an apparatus 70a for buffered phase compensation, as shown in FIG. 7a. Here the "buffered" means that the apparatus 70a holds a whole OFDM symbol for estimating residual phase error and compensating the same OFDM symbol. The apparatus 70a is deployed at the receiver of the OFDM system to compensate a received OFDM symbol with the residual phase error estimated after the received OFDM symbol being compensated by the apparatus 30a/30b. The apparatus 70a includes: a buffer 71 for storing the received OFDM symbol compensated by the apparatus 30a/30b; a pilot subchannel compensator 72, coupled to the buffer 71, for compensating the pilot signal of the received OFDM symbol to generate a channel-compensated pilot signal (i.e. $\tilde{X}_{n,k}$ of equation (2-2)); a phase error estimator 73, coupled to the pilot subchannel compensator 72, for generating an estimated residual phase error between the channel-compensated pilot signal and the original pilot signal transmitted by the transmitter; and a phase rotator 74 for compensating the data signal of the received OFDM symbol with the estimated residual phase error.

The architecture of FIG. 7a can be modified as FIG. 7b, where the components of the apparatus 70b are the same as those of the apparatus 70a, while in operation, the architecture of FIG. 7b compensates the data signal of the received OFDM symbol by a data subchannel compensator 75 before providing it to the phase rotator 74.

Figure 8:
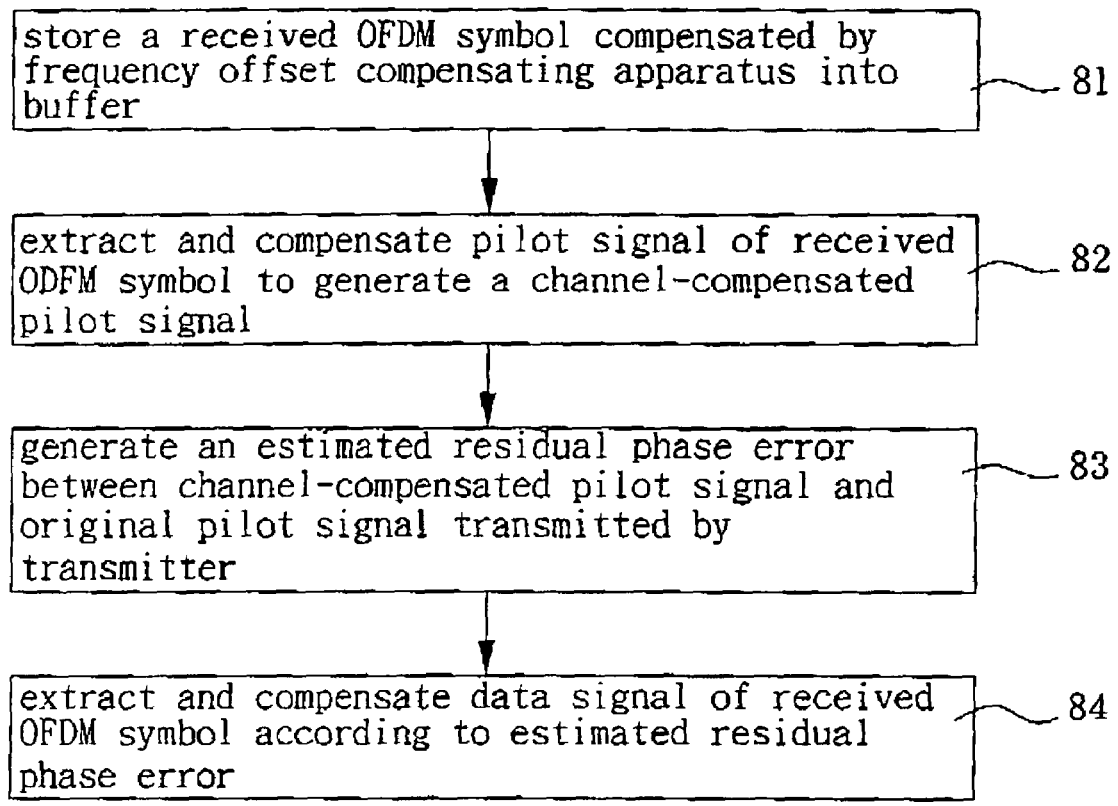
FIG. 8 is a flow chart of a method for buffered phase compensation according to the present invention.

By applying the apparatus 70a, the present invention provides a method for buffered phase compensation, which includes the steps as shown in FIG. 8:

81 storing a received OFDM symbol compensated by the apparatus 30a/30b into the buffer 71;

82 the pilot subchannel compensator 73 extracting and compensating the pilot signal of the received OFDM symbol to generate a channel-compensated pilot signal;

83 the phase error estimator 73 generating an estimated residual phase error between the channel-compensated pilot signal and the original pilot signal transmitted by the transmitter; and 84 the phase rotator 74 extracting and compensating the data signal of the received OFDM symbol according to the estimated residual phase error.

If the OFDM system uses a plurality of pilot subchannel, then in the step 83, the estimated residual phase error can be generated by averaging the phase error between the extracted pilot signal and the original pilot signal transmitted by the transmitter within each pilot subchannel, as shown in equation (2-3).

If the apparatus 70b is applied, then the steps 81-84 are the same, except in the step 84 the data signal of the received OFDM symbol is compensated by the data subchannel compensator 75 before phase compensation.

Figure 9:
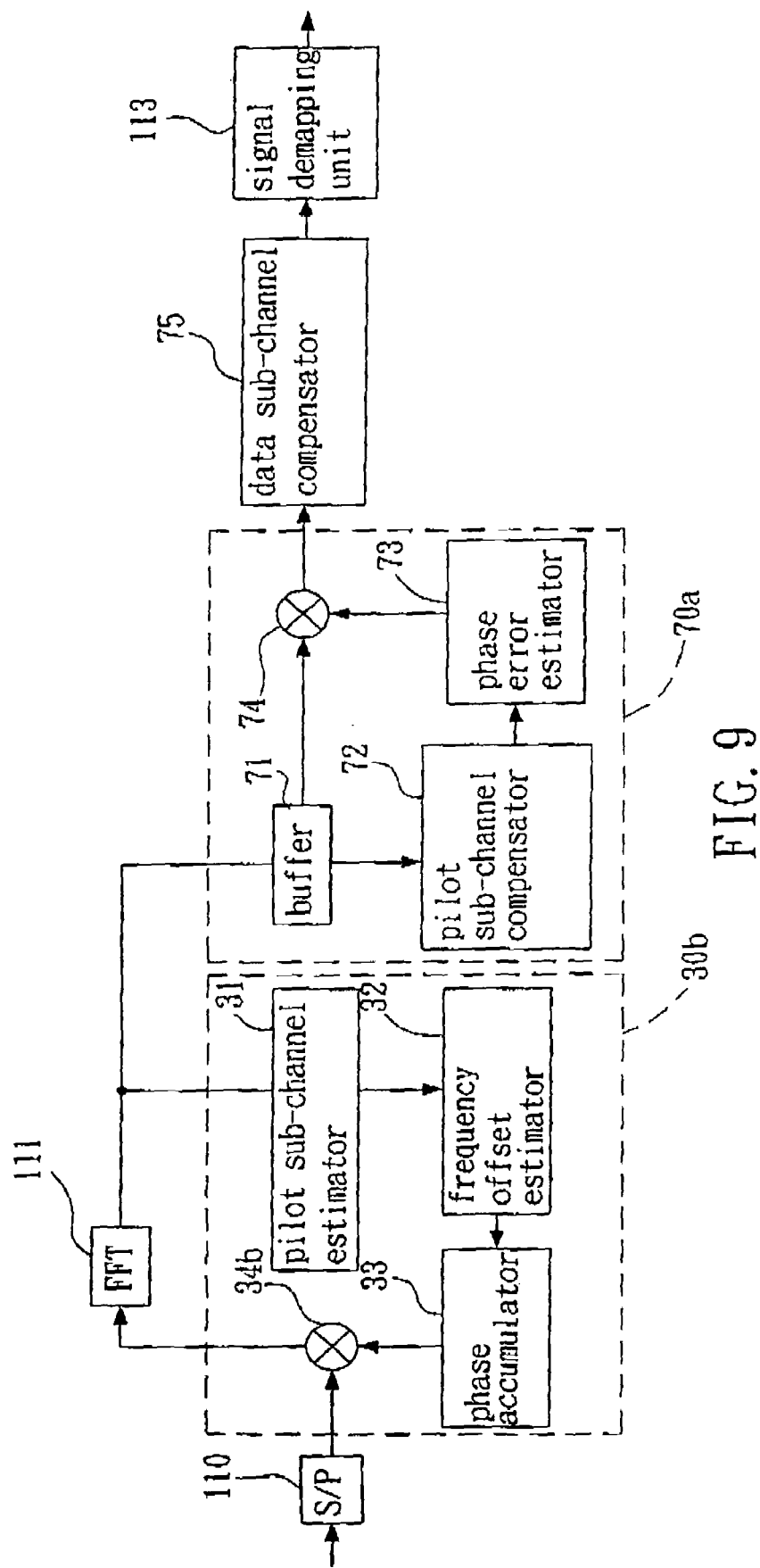
FIG. 9 is a block diagram of an embodiment of the compensation module according to the present invention.
Figure 10:
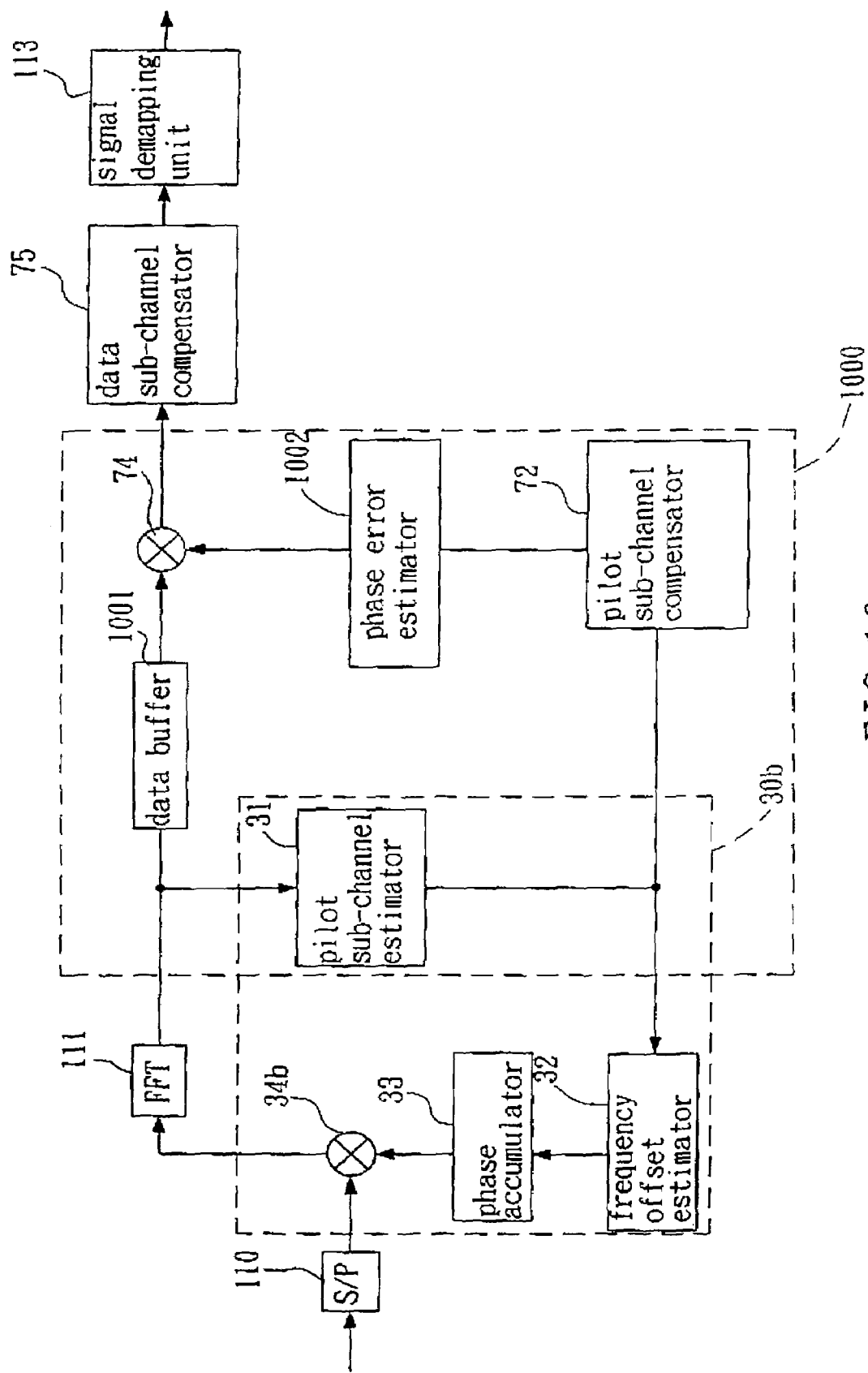

Please refer to FIGS. 9 and 10. The embodiments of the present invention provide compensating modules, which are composed of one of the apparatus 30a/30b for carrier frequency offset compensation and one of the apparatus 50a/50b/70a/70b for phase compensation, according to various requirements of the OFDM system. The compensating modules of the embodiments of the present invention are to compensate phase rotation of the OFDM symbol at the receiver caused by the carrier frequency offset. FIG. 9 is a block diagram of an embodiment of the compensation module according to the present invention. The embodiment of FIG. 9, composed of the apparatus 30b for carrier frequency offset compensation and the apparatus 70a for phase compensation, is applied to the OFDM system which employs local oscillators with large carrier frequency offset and phase noise.

In FIG. 9, the pilot subchannel estimator 31 of the apparatus 30b performs the operation of equation (1-2), and the pilot subchannel compensator 72 of the apparatus 70a performs the operation of equation (2-2). If $\tilde{Y}_{n,k}$ of equation (2-1) is simultaneously divided by $X_{n,k}$ and $\hat{H}_k$, that is, $$\tilde{P}_{n,k} = \frac{\tilde{Y}_{n,k}}{X_{n,k} \cdot \hat{H}_k} = e^{j\Delta\theta_n} + \Omega_{n,k} \tag{2-4}$$

where k is the pilot index and $\Omega_{n,k}$ represents ICI and other noises.

Based on above analysis, the residual phase error can be estimated by the following equation (it is assumed that the OFDM system uses K pilot subchannels):

$$\Delta \hat{\theta}_n = \frac{1}{K} \sum_{k=pilot\ index} L\tilde{P}_{n,k} \quad (2\text{-}5)$$

In (2-4), $\tilde{P}_{n,k}$ is the pilot signal after channel estimation and channel compensation, i.e. the signal generated from $\tilde{Y}_{n,k}$ passing through the pilot subchannel estimator 31 and the pilot subchannel compensator 72. Therefore, the architecture of FIG. 9 can be modified as FIG. 10. The block 1000 of FIG. 10 can be viewed as an apparatus for phase compensation, which is the portion for compensating the residual phase error in the architecture of FIG. 10. In the block 1000, after passing through the pilot subchannel estimator 31 and the pilot subchannel compensator 72, the signal $\tilde{Y}_{n,k}$ becomes $\tilde{P}_{n,k}$. The phase error estimator 1002 performs the operation of equation (2-5), which is simpler than that of equation (2-3) performed by the phase error estimator 73. Besides, the data buffer 1001, used to store only the data signal of an OFDM symbol, can save more space than the buffer 71 since the buffer 71 stores the whole OFDM symbol. Therefore, in addition to being suitable for use in the OFDM system which employs local oscillators with large carrier frequency offset and phase noise, the architecture of FIG. 10 is further simplified.

While the present invention has been shown and described with reference to the preferred embodiments thereof, and in terms of the illustrative drawings, it should be not considered as limited thereby. Various possible modification, omission, and alterations could be conceived of by one skilled in the art to the form and the content of any particular embodiment, without departing from the scope and the spirit of the present invention.

What is claimed is:

1. An apparatus for carrier frequency offset compensation at a receiver of a communication system, wherein a symbol signal modulated by a carrier is transmitted via a plurality of subchannels, wherein the symbol signal comprises a pilot signal and the subchannels comprise at least a pilot subchannel for transmitting the pilot signal, the apparatus comprising:
   a pilot subchannel estimator for generating an estimated frequency response of the pilot signal;
   a frequency offset estimator, coupled to the pilot subchannel estimator, for generating an estimated carrier frequency offset according to a phase error between the estimated frequency response of the symbol signal in a frequency domain and an estimated frequency response of a following symbol signal in the frequency domain;
   a phase accumulator, coupled to the frequency offset estimator, for calculating an accumulated phase rotation according to the estimated carrier frequency offset; and
   a phase rotator, coupled to the phase accumulator, for carrier frequency offset compensation according to the accumulated phase rotation, wherein based on value of the estimated carrier frequency offset, the phase rotator performs frequency offset compensation in either the time domain or the frequency domain;
   wherein if the subchannels comprise a plurality of the pilot subchannels for transmitting a plurality of pilot signals, then the pilot subchannel estimator is for generating a plurality of estimated frequency responses corresponding to the pilot signals, and the frequency offset estimator coupled to the pilot subchannel estimator is for generating an estimated carrier frequency offset according to the estimated frequency responses of one of the pilot signals of the symbol signal and that of a corresponding pilot signal of a following symbol signal; and
   further wherein the estimated carrier frequency offset is generated through generating a plurality of phase errors, wherein each of the phase errors is generated according to the estimated frequency response of one of the pilot signals of the symbol signal and that of a corresponding pilot signal of the following symbol signal, and then averaging the phase errors.

2. An apparatus for phase compensation at a receiver of a communication system, wherein a symbol signal modulated by a carrier is transmitted via a plurality of subchannels, wherein the symbol signal comprises a pilot signals and the subchannels comprise at least a pilot subchannel for transmitting the pilot signal, the apparatus comprising:
   a pilot subchannel estimator for generating an estimated frequency response corresponding to each pilot subchannel;
   a frequency offset estimator coupled to the pilot subchannel estimator for generating an estimated carrier frequency offset according to the estimated frequency responses of one of the pilot signals of the symbol signal and that of a corresponding pilot signal of a following symbol signal;
   a carrier frequency offset compensator coupled to the frequency offset estimator to perform a carrier frequency offset compensation on the symbol signal;
   a channel compensator to perform a channel compensation on the symbol signal;
   a phase error estimator for extracting the pilot signal and generating an estimated residual phase error between the extracted pilot signal and an original pilot signal;
   a buffer for storing the estimated residual phase error; and
   a phase rotator, coupled to the buffer, for compensating a following symbol signal according to the estimated residual phase error;
   wherein the following symbol signal is compensated by the channel compensator after being compensated by the phase rotator;
   wherein if the subchannels comprise a plurality of the pilot subchannels for transmitting a plurality of pilot signals, then the pilot subchannel estimator is for generating a plurality of estimated frequency responses corresponding to the pilot signals, and the frequency offset estimator coupled to the pilot subchannel estimator is for generating an estimated carrier frequency offset according to the estimated frequency responses of one of the pilot signals of the symbol signal and that of a corresponding pilot signal of a following symbol signal; and
   further wherein the estimated carrier frequency offset is generated through generating a plurality of phase errors, wherein each of the phase errors is generated according to the estimated frequency response of one of the pilot signals of the symbol signal and that of a corresponding pilot signal of the following symbol signal, and then averaging the phase errors.

3. An apparatus for phase compensation at a receiver of a communication system, wherein a symbol signal modulated by a carrier is transmitted via a plurality of subchannels, wherein the symbol signal comprises a least a pilot signal and at least a data signal, and the subchannels comprise at least a pilot subchannel for transmitting the pilot signal and at least a data subchannel for transmitting the data signal, the apparatus comprising:

a pilot subchannel estimator for generating an estimated frequency response corresponding to each pilot subchannel;

a frequency offset estimator coupled to the pilot subchannel estimator for generating an estimated carrier frequency offset according to the estimated frequency responses of one of the pilot signals of the symbol signal and that of a corresponding pilot signal of a following symbol signal;

a carrier frequency offset compensator to perform a carrier frequency offset compensation on the symbol signal;

a buffer for storing the symbol signal after carrier frequency offset compensation;

a pilot subchannel compensator, coupled to the buffer, for compensating the pilot signal to generate a channel-compensated pilot signal;

a phase error estimator, coupled to the pilot subchannel compensator, for generating an estimated residual phase error between the channel-compensated pilot signal and an original pilot signal;

a phase rotator for compensating the data signal according to the estimated residual phase error;

wherein the data signal is compensated by a data subchannel compensator after being compensated by the phase rotator;

wherein if the subchannels comprise a plurality of the pilot subchannels for transmitting a plurality of pilot signals, then the pilot subchannel estimator is for generating a plurality of estimated frequency responses corresponding to the pilot signals, and the frequency offset estimator coupled to the pilot subchannel estimator is for generating an estimated carrier frequency offset according to the estimated frequency responses of one of the pilot signals of the symbol signal and that of a corresponding pilot signal of a following symbol signal; and further wherein the estimated carrier frequency offset is generated through generating a plurality of phase errors, wherein each of the phase errors is generated according to the estimated frequency response of one of the pilot signals of the symbol signal and that of a corresponding pilot signal of the following symbol signal, and then averaging the phase errors.

4. A compensating module at a receiver of a communication system, wherein a symbol signal modulated by a carrier is transmitted via a plurality of subchannels, wherein the symbol signal comprises at least a pilot signal and at least a data signal, and the subchannels comprise at least a pilot subchannel for transmitting the pilot signal and at least a data subchannel for transmitting the data signal, the compensating module comprising:

a frequency offset compensator to perform a frequency offset compensation on the symbol signal according to an estimated frequency response of the pilot subchannel transmitting the pilot signal, the frequency offset compensator comprising:

a pilot subchannel estimator for generating the estimated frequency response of the pilot signal;

a frequency offset estimator, coupled to the pilot subchannel estimator, for generating the estimated carrier frequency offset according to the phase error between the estimated frequency response of the pilot signal of the symbol signal in a frequency domain and the estimated frequency response of the pilot signal of a following symbol signal in the frequency domain;

a phase accumulator, coupled to the frequency offset estimator, for calculating an accumulated phase rotation according to the estimated carrier frequency offset;

a phase rotator, coupled to the phase accumulator, for performing frequency offset compensation according to the accumulated phase rotation, wherein based on the magnitude of the carrier frequency offset, the phase rotator performs frequency offset compensation in either the time domain or the frequency domain;

a phase compensator to perform a phase compensation on the frequency offset compensated symbol signal according to an estimated residual phase error of the pilot signal; and wherein the phase compensator comprises:

a data buffer for storing the data signal of the frequency offset-compensated symbol signal;

a pilot subchannel compensator, coupled to the pilot subchannel estimator, for compensating the pilot signal of the frequency offset-compensated symbol signal and for generating a channel-compensated pilot signal;

a phase error estimator, coupled to the pilot subchannel compensating device, for generating an estimated residual phase error between the channel-compensated pilot signal and an original pilot signal transmitted by the transmitter; and a first phase rotator, coupled to the phase error estimator and the data buffer, for compensating the data signal of the frequency offset-compensated symbol signal according to the estimated residual phase error.

5. The compensating module of claim 4, wherein the phase compensator comprises:

a phase error estimator for extracting the pilot signal of the frequency offset compensated symbol signal, and generating the estimated residual phase error between the extracted pilot signal and an original pilot signal transmitted by the transmitter;

a buffer for storing the estimated residual phase error; and a phase rotator, coupled to the buffer, for compensating a following frequency offset compensated symbol signal according to the estimated residual phase error.

6. The compensating module of claim 4, wherein the phase compensator comprises:

a buffer for storing the frequency offset compensated symbol signal;

a pilot subchannel compensator, coupled to the buffer, for compensating the pilot signal of the frequency offset-compensated symbol signal to generate a channel-compensated pilot signal;

a phase error estimator, coupled to the pilot subchannel compensator, for generating an estimated residual phase error between the channel-compensated pilot signal and an original pilot signal transmitted by the transmitter; and a phase rotator for compensating the data signal of the frequency offset-compensated symbol signal according to the estimated residual phase error.

7. The compensating module of claim 4, wherein the compensating module further comprises a channel compensator to perform a channel compensation on the frequency offset compensated symbol signal.

8. A method for carrier frequency offset compensation used at a receiver of a communication system, wherein a symbol signal modulated by a carrier is transmitted via a plurality of subchannels, wherein the symbol signal comprises at least a pilot signal and the subchannels comprise at least a pilot subchannel for transmitting the pilot signal, the method comprising:

generating an estimated frequency response of the pilot signal;

determining a phase error according to the estimated frequency response of the pilot signal of the symbol signal in a frequency domain and the estimated frequency response of the pilot signal of a following symbol signal in the frequency domain;

generating an estimated carrier frequency offset according to the phase error;

calculating an accumulated phase rotation according to the estimated carrier frequency offset;

based on the magnitude of the carrier frequency offset, utilizing a phase rotator to perform carrier frequency offset compensation according to the accumulated phase rotation in either the time domain or the frequency domain;

wherein if the subchannels comprise a plurality of the pilot subchannels for transmitting a plurality of pilot signals, then the pilot subchannel estimator is for generating a plurality of estimated frequency responses corresponding to the pilot signals, and the frequency offset estimator coupled to the pilot subchannel estimator is for generating an estimated carrier frequency offset according to the estimated frequency responses of one of the pilot signals of the symbol signal and that of a corresponding pilot signal of a following symbol signal; and further wherein the estimated carrier frequency offset is generated through generating a plurality of phase errors, wherein each of the phase errors is generated according to the estimated frequency response of one of the pilot signals of the symbol signal and that of a corresponding pilot signal of the following symbol signal, and then averaging the phase errors.

9. A method for phase compensation used at a receiver of a communication system, wherein a symbol signal modulated by a carrier is transmitted via a plurality of subchannels, wherein the symbol signal comprises at least a pilot signal and at least a data signal, and the subchannels comprise at least a pilot subchannel for transmitting the pilot signal and at least a data subchannel for transmitting the data signal, the method comprising:

extracting the pilot signal;

generating an estimated residual phase error between the extracted pilot signal and an original pilot signal transmitted by the transmitter;

compensating a following symbol signal according to the estimated residual phase error;

utilizing a channel compensator to compensate the following symbol signal after compensating the following symbol signal according to the estimated residual phase error;

wherein if the subchannels comprise a plurality of the pilot subchannels for transmitting a plurality of pilot signals, the estimated residual phase error is generated through extracting the pilot signals, generating a plurality of estimated residual phase errors between each of the extracted pilot signal and a corresponding original pilot signal, and averaging the estimated residual phase errors; and further wherein estimating a carrier frequency offset generated through the residual phase errors, wherein each of the residual phase errors are generated according to a estimated frequency response of one of the pilot signals of the symbol signal and the estimated frequency response of a corresponding pilot signal of the following symbol signal, and then averaging the phase errors.

10. A method for phase compensation used at a receiver of a communication system, wherein a symbol signal modulated by a carrier is transmitted via a plurality of subchannels, wherein the symbol signal comprises at least a pilot signal and at least a data signal, and the subchannels comprise at least a pilot subchannel for transmitting the pilot signal and at least a data subchannel for transmitting the data signal, the method comprising:

storing the symbol signal;

extracting and compensating the pilot signal to generate a channel-compensated pilot signal;

generating an estimated residual phase error between the channel-compensated pilot signal and an original pilot signal transmitted by the transmitter;

extracting and compensating the data signal according to the estimated residual phase error;

utilizing a data subchannel compensator to compensate the data signal after compensating the data signal according to the estimated residual phase error; and wherein if the subchannels comprise a plurality of pilot subchannels for transmitting a plurality of pilot signals, the method comprises: generating a plurality of phase errors, wherein each of the phase errors is determined according to one of the pilot signals and a corresponding original pilot signals; and averaging the phase errors.

11. the method of claim 10, wherein the method further comprises performing a channel compensation on the symbol signal before performing compensation according to the estimate residual phase error on the data signal.

* * * * *